United States Patent [19]
Montegari et al.

[11] Patent Number: 5,507,307
[45] Date of Patent: Apr. 16, 1996

[54] METHOD AND APPARATUS FOR RECYCLING WASTE LUBRICATION OIL FOR REUSE AS FUEL OIL

[76] Inventors: Daniel F. Montegari, 44 Songsparrow La., Centereach, N.Y. 11720; Otto Jacobi, 163 Pauls Path North, Coram, N.Y. 11727

[21] Appl. No.: 261,938

[22] Filed: Jun. 17, 1994

[51] Int. Cl.⁶ .................................................. F17D 1/17
[52] U.S. Cl. ............................... 137/9; 208/182; 208/179
[58] Field of Search ................... 123/196 R, 196 S, 123/196 A; 184/1.5, 6.4, 6.24; 208/184, 185, 179, 182; 44/639, 629; 137/9

[56] References Cited

U.S. PATENT DOCUMENTS

| | | | |
|---|---|---|---|
| 3,383,190 | 5/1968 | Weber et al. | 44/629 |
| 3,929,645 | 12/1975 | Bugelski et al. | 210/251 |
| 4,272,359 | 6/1981 | Owen | 208/179 |
| 4,392,463 | 7/1983 | Yasuhara | 123/196 M |
| 4,417,561 | 11/1983 | Yasuhara | 123/196 R |
| 4,421,078 | 12/1983 | Hurner | 123/196 S |
| 4,674,456 | 6/1987 | Merritt | 123/196 S |
| 4,784,751 | 11/1988 | McGehee | 208/179 |
| 4,869,346 | 9/1989 | Nelson | 123/196 S |
| 5,238,085 | 8/1993 | Engelmann | 123/196 S |
| 5,316,743 | 5/1994 | LeBlanc et al. | 208/179 |
| 5,336,396 | 8/1994 | Shetley | 123/575 |
| 5,353,760 | 10/1994 | Zager | 123/196 S |
| 5,366,520 | 11/1994 | Tiemeyer | 44/629 |

FOREIGN PATENT DOCUMENTS

1174630  9/1984  Canada .................................. 208/179

*Primary Examiner*—Erick R. Solis
*Attorney, Agent, or Firm*—Galgano & Burke

[57] ABSTRACT

A method for recycling waste lubrication oil for use as fuel oil includes pumping new fuel oil from a source and monitoring the flow rate of the new fuel oil; pumping waste oil from a source through at least one filter and adjusting the flow rate of the waste oil according to the monitored flow rate of the new fuel oil and a preselected blend ratio; combining the filtered waste oil with the fuel oil in a static mixer; and dehydrating the blended oil prior to dispensation. An apparatus for performing the method includes a fuel pump fluidly coupled to a source of fuel oil and fluidly feeding a flow meter which is electrically coupled to a control circuit. A waste oil pump is fluidly coupled to a source of waste oil and to at least one depth media filter and is electrically coupled to the control circuit. The outputs of the flow meter and the depth media filter are fluidly coupled to a static mixer which is fluidly coupled to a coalescer. The output of the coalescer supplies a clean, dehydrated blend of fuel oil and waste oil. The control circuit adjusts the flow rate of the waste oil pump according to the flow meter and a preselected ratio of fuel oil to waste oil in infinite increments from 0 to 10%.

15 Claims, 3 Drawing Sheets

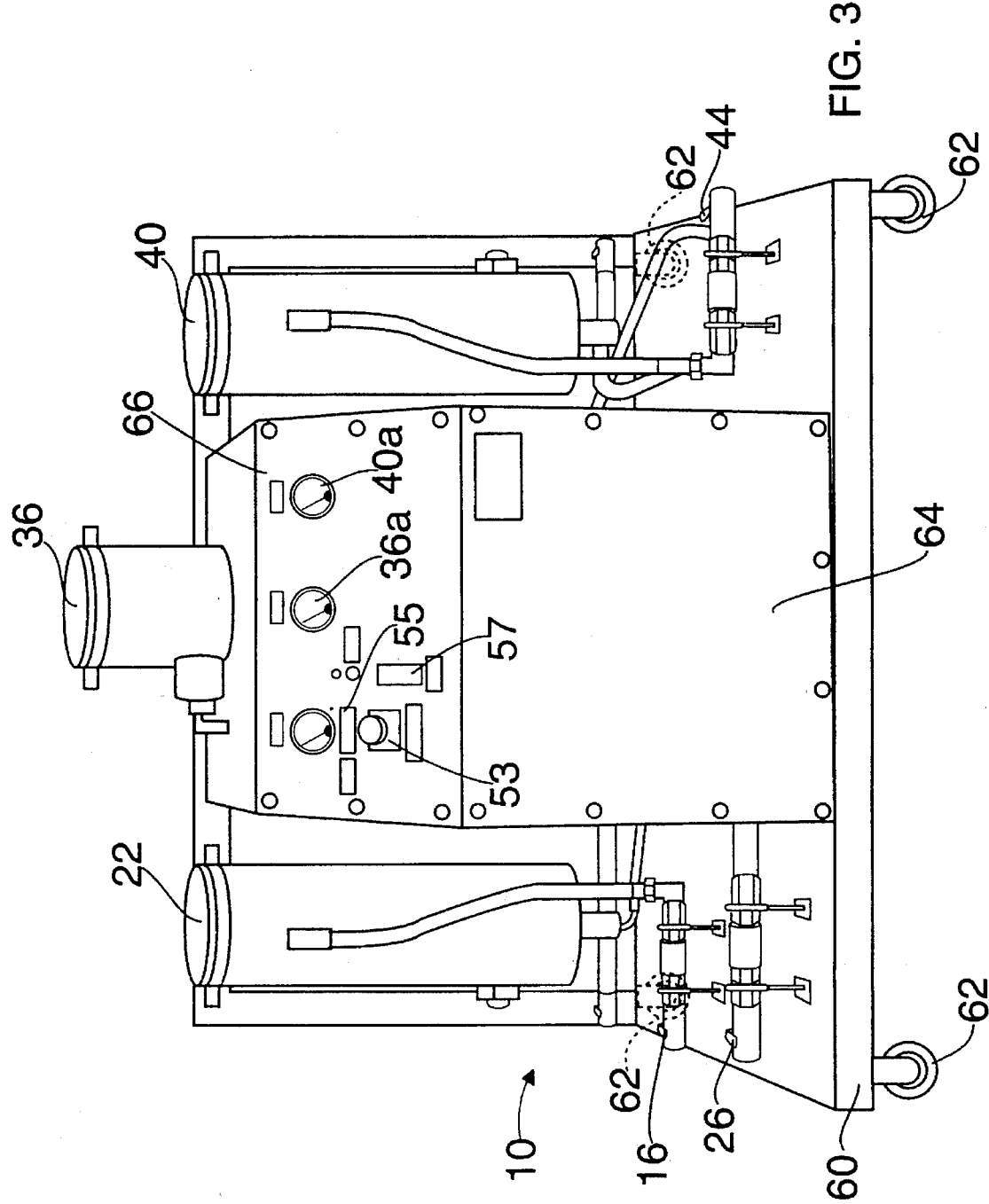

5,507,307

METHOD AND APPARATUS FOR RECYCLING WASTE LUBRICATION OIL FOR REUSE AS FUEL OIL

BACKGROUND OF THE INVENTION

1. Field of the Invention

The invention relates to the recycling of waste oil. More particularly, the invention relates to a method and apparatus for filtering engine lubrication waste oil and blending it with diesel fuel to produce a water free diesel fuel that can be burned in a diesel engine or other fuel oil consuming device.

2. State of the Art

Recycling of waste materials has been and continues to be a matter of great national concern. Moreover, conservation of petroleum products has been and continues to be a matter of equal national concern. Presently, internal combustion engines are widely used throughout the United States and throughout the world. Virtually all of these engines, in addition to consuming petroleum products during combustion, use lubrication oil which is not consumed, but which is contaminated through use. The lubrication oil in an internal combustion engine must be replaced quite frequently, and the disposition of the used lubrication oil is a continuing environmental problem.

As early as 1975, methods were proposed for the large scale removal of lead and other suspended solids from used hydrocarbon lubrication oil. One such method is described in U.S. Pat. No. 3,923,643 to Lewis et al. where the used lubrication oil is subjected to heat treatment and centrifuging or gravity settling. The purified oil may be suitably employed in many industrial applications of heavy oils such as fuel oil.

On a very small scale (i.e. within an individual engine) it has been known to blend used lubrication oil with fuel oil as a means of conservation and as a method of disposing of the used lubrication oil. U.S. Pat. No. 4,421,078 to Hurner describes an apparatus for extracting small quantities of lubrication oil from the oil pan of a truck engine and blending the lubrication oil with fuel oil while the extracted oil is automatically replenished with fresh lubrication oil. Hurner does not treat the used lubrication oil before mixing it with fuel oil, however. A similar, though more elaborate system is disclosed in U.S. Pat. No. 4,345,429 to Yasuhara where engine lubrication oil is blended with engine fuel oil, but only after the lubrication oil has been atomized in a soot collector placed inline with engine exhaust gasses.

A method and apparatus for reclaiming contaminated oil on an intermediate scale is disclosed in U.S. Pat. No. 4,784,751 to McGehee. McGehee's apparatus includes a divided tank which is approximately 4'×4'×3' and mounted on wheels for use in a truck service station or similar facility. Contaminated oil is reclaimed for fuel use by pumping it through an oil filter into one side of a divided tank from which it is heated to burn off water and antifreeze, and then into the other side of the tank where the oil is blended with clean oil such as diesel fuel. The mixture is then pumped through a water separator and another oil filter.

In order to produce an efficient blend of fuel oil and recycled lubrication oil, a precise mixture of the two components is necessary. While it is generally known to blend recycled lubrication oil with new fuel oil, precision methods of performing such a blending on a large scale are not available. Moreover, it is also necessary that the recycled component be thoroughly filtered prior to blending with new fuel oil and that the blend be dehydrated. While some of the known methods produce a relatively clean recycled component, they do so at the expense of time which prohibits their application in a large scale operation.

SUMMARY OF THE INVENTION

It is therefore an object of the invention to provide an apparatus for the precise blending of recycled lubrication oil with new fuel oil to produce an efficient mixture on a large scale.

It is also an object of the invention to provide an apparatus for thoroughly cleaning used lubrication oil prior to blending it with new fuel oil and for dehydrating the blended oil.

It is another object of the invention to provide a method for monitoring and controlling the ratio of recycled oil to new oil during blending.

It is still another object of the invention to provide a method for monitoring and controlling the cleaning of recycled oil while automatically and continuously blending the cleaned oil with new fuel oil.

It is yet another object of the invention to provide an apparatus in which the blended proportion of cleaned waste oil to new oil is selectable.

It is also an object of the invention to provide an apparatus in which the cleaning, blending and dehydrating of oil proceeds at a rate which is fast enough to accommodate a large scale commercial operation.

It is another object of the invention to provide an apparatus which does not require frequent maintenance.

It is still another object of the invention to provide an apparatus which is easy and inexpensive to maintain.

In accord with these objects which will be discussed in detail below, the method of the present invention includes pumping new fuel oil from a source and monitoring the flow rate of the new fuel oil; pumping waste oil from a source through at least one filter and adjusting the flow rate of the waste oil according to the monitored flow rate of the new fuel oil and a preselected blend ratio; combining the filtered waste oil with the fuel oil in a static mixer; and dehydrating the blended oil prior to dispensation.

The apparatus of the present invention includes a fuel pump fluidly coupled to a source of fuel oil and fluidly feeding a flow meter which is electrically coupled to a control circuit. A waste oil pump is fluidly coupled to a source of waste oil and to at least one depth media filter and is electrically coupled to the control circuit. The fluid outputs of the flow meter and the depth media filter are fluidly coupled to a static mixer the fluid output of which is fluidly coupled to a coalescer. The fluid output of the coalescer supplies a clean, dehydrated blend of fuel oil and waste oil which is suitable for use as fuel oil in a diesel engine or in an oil furnace. The control circuit adjusts the flow rate of the waste oil pump according to the flow rate indicated by the flow meter and a preselected ratio of fuel oil to waste oil in infinite increments from 0 to 10%.

Preferred aspects of the invention include: double filtering the waste oil prior to blending it with the fuel oil; arranging the waste oil pump intermediate of the two waste oil filters; driving the waste oil pump with a DC motor, the speed of which is monitored by an electromagnetic sensor and controlled by a compensated feedback loop driving an SCR controller. The flow meter converts the rate of fuel oil flow into a signal which is used by the control circuit to control the speed of the DC motor driving the waste oil pump. The first waste oil filter is preferably a ram packed depth media sock type filter which removes particulate matter which is 7 microns or larger. The second waste oil filter is preferably a similar type of filter which removes particulate matter which is 5 microns or larger. The static mixer is preferably a viscosity sensitive kinetics type mixer with helical elements which emulsify the waste oil and fuel oil to an homogeneous mixture. The coalescer is preferably a multi-element filter and water separator which removes particulate matter which is 10 microns or larger and removes 99.6% of free standing or emulsified water from the fuel/waste oil mixture. The waste and fuel oil are completely filtered and blended in three seconds and the apparatus produces a continuous output at a rate of 15 gallons per minute. Each of the filters in the apparatus is preferably provided with a differential pressure indicator to indicate when filter elements need to be replaced or cleaned. The entire apparatus and control circuit are preferably mounted on a portable wheeled platform and the apparatus will function properly even if the platform is inclined at an angle up to 45 degrees. The control circuit is easily calibrated by using a flow meter which provides an output signal which is directly proportional the flow rate and by using a waste oil pump which provides a flow rate which is directly proportional to the speed of the motor driving the pump.

Additional objects and advantages of the invention will become apparent to those skilled in the art upon reference to the detailed description taken in conjunction with the provided figures.

BRIEF DESCRIPTION OF THE DRAWINGS

FIG. 3 is a perspective view of a preferred embodiment of the invention mounted on a portable wheeled platform.

DETAILED DESCRIPTION OF THE PREFERRED EMBODIMENTS

Figure 1:
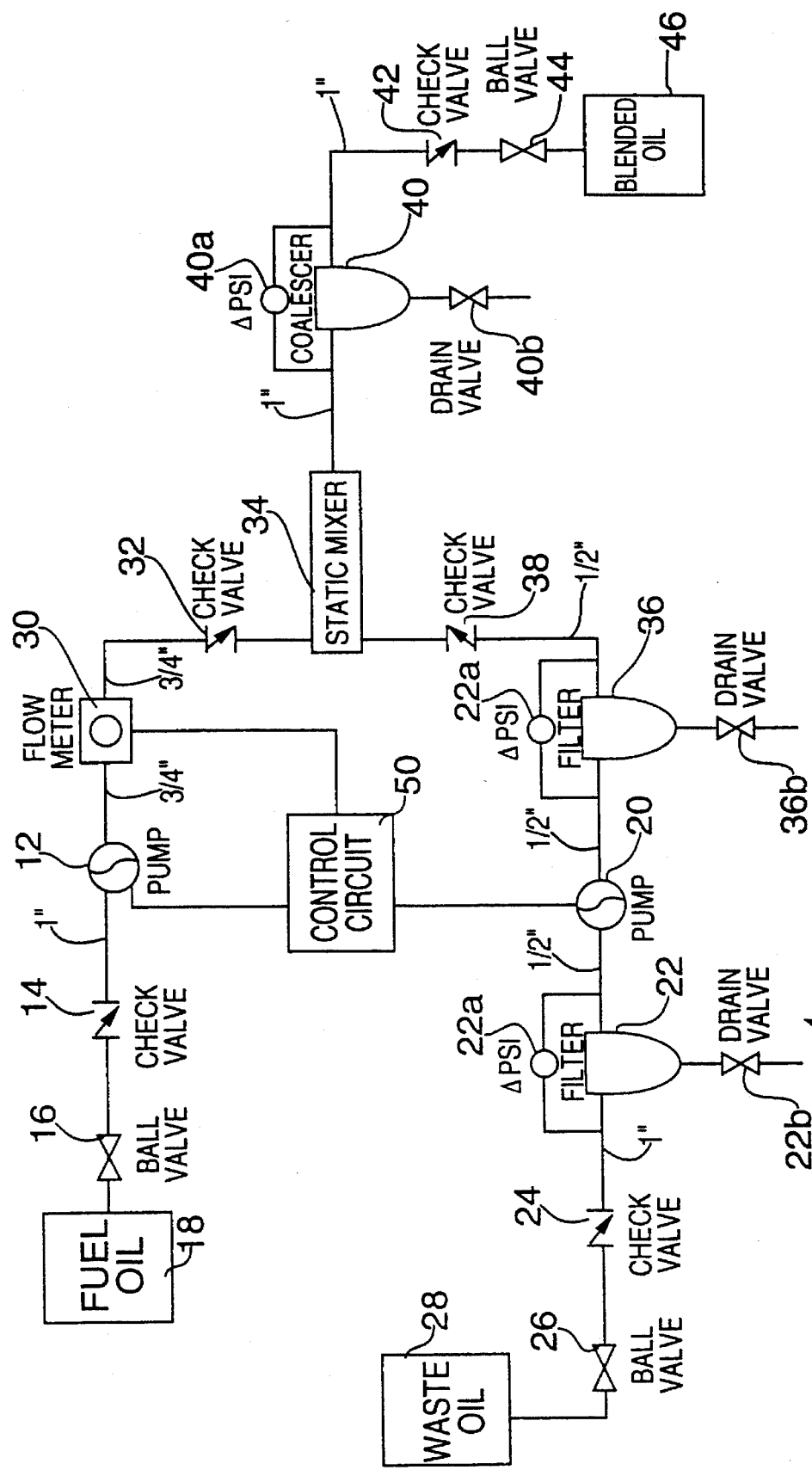
FIG. 1 is a schematic view of the apparatus of the invention.

Referring now to FIG. 1, the apparatus 10 for recycling waste lubrication oil for reuse as fuel oil includes a primary pump 12 which is fluidly coupled through a check valve 14 and a shut-off valve 16 to a source of fuel oil 18. A secondary pump 20 is fluidly coupled through a first filter 22, a check valve 24, and a shut-off valve 26 to a source of waste oil 28. The primary pump 12 draws fuel oil 18 through the shut-off valve 16 and the check valve 14 and pumps the oil through a flow meter 30 and a check valve 32 into a static mixer 34. The secondary pump 20 draws waste oil 28 through shut-off valve 26, check valve 24 and first filter 22 and pumps the oil through a second filter 36 and a check valve 38 into the static mixer 34. The output of the static mixer 34 is fluidly coupled to a coalescer filter 40 which in turn is coupled to a check valve 42 and a shut-off valve 44 feeding a container for blended oil 46. As those skilled in the art will appreciate, when the primary pump 12 and the secondary pump 20 are activated, fuel oil 18 is fed under pressure to the static mixer 34 and waste oil 28 is drawn through filter 22 and fed under pressure through filter 36 into the static mixer 34. The two oils are blended under pressure in the static mixer 34 and fed through the coalescer filter 40 and continue under pressure through the check valve 42 and shut-off valve 44 into the container for collection of blended oil 46. The check valves prevent undesired back flow of the oils through the system and the shut-off valves allow for the replacement and/or replenishment of the waste oil, fuel oil, and blended oil containers and for the replacement of filter elements. In accord with the invention each filter 22, 36, 40 is provided with a corresponding differential pressure gauge 22a, 36a, 40a, to indicate the condition of the filter and a corresponding drain valve 22b, 36b, 40b so that the filter tank can be drained and the filter element (not shown) can be replaced as needed.

According to a presently preferred embodiment of the invention, the shut-off valves 16, 26, and 44 as well as the drain valves 22b, 36b, 40b are 1" ball valves and the check valves 14, 24, and 42 are also 1" valves. The fluid couplings between the fuel oil container 18 and the primary pump 12 are preferably accomplished with 1" AEROQUIP hose as are the fluid couplings between the waste oil container 28 and the first filter 22 and the fluid couplings between the static mixer 34 and the blended oil container 46. The fluid couplings between the primary pump 12 and the static mixer 34 are preferably accomplished with ¾" AEROQUIP hose and the fluid couplings between the first filter 22 and the static mixer 34 are preferably accomplished with ½" AEROQUIP hose. Consequently, the check valve 32 is preferably a ¾" valve and the check valve 38 is preferably a ½" valve.

The primary pump 12 is preferably a FILL-RITE Series 700B or a suitable equivalent positive displacement pump having a built in pressure relief valve and inlet filter and producing a relatively constant 15 GPM flow rate. The secondary pump 20 is preferably a gear type pump driven by a ¾ HP DC motor such as the OBERDORFER 2000R pump or a suitable equivalent which produces a variable flow rate which is relatively directly proportional to the speed of the motor.

The first filter 22 is preferably a 5–7 micron depth media filter such as the NELSON Model #95303A or equivalent and the second filter 36 is preferably a 3–5 micron depth media filter such as the NELSON Model #95353B or equivalent.

The static mixer 34 is preferably a viscosity sensitive kinetics type mixer with helical elements such as the Model #1-10-332-5 from the CURT T. LESKER CO. and the coalescer 40 is preferably a NELSON Model #91293N or a suitable equivalent multi-element filter and water separator which removes particulate matter which is 10 microns or larger and removes 99.6% of free standing or emulsified water from the fuel/waste oil mixture.

As shown in FIG. 1, the primary pump 12, the secondary pump 20, and the flow meter 30 are electrically coupled to a control circuit. The flow meter 30, which is preferably a PROTEUS Model #0660B, generates an output pulse train having a frequency which is directly proportional to the flow rate metered.

Figure 2:
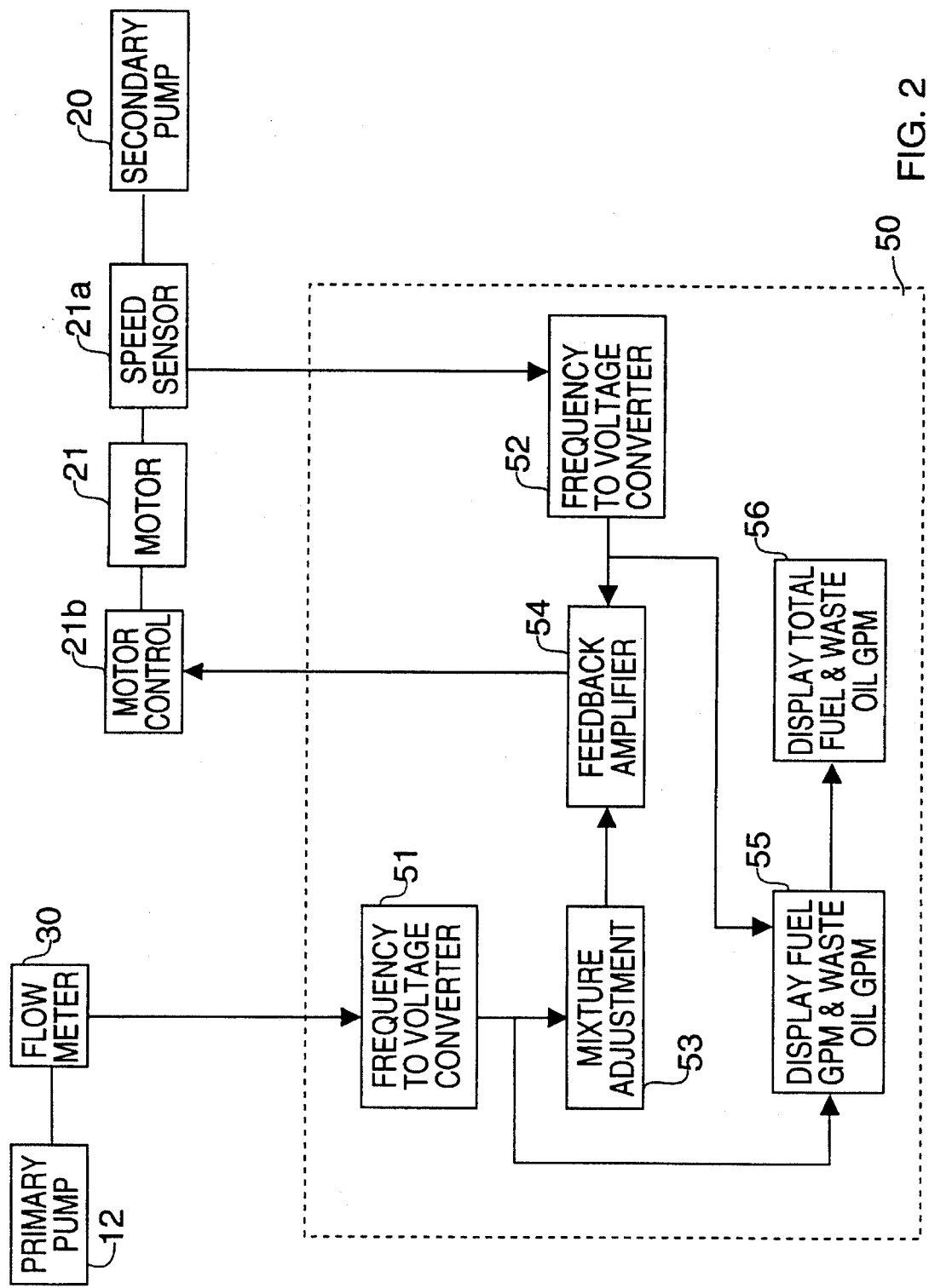
FIG. 2 is a schematic view of the control circuit of the invention.

Turning now to FIG. 2, the control circuit 50 is shown in a block diagram. The circuit 50 is coupled to a power supply (not shown) which is preferably a conventional 110/120 V AC single phase 60 Hz line which is transformed and rectified to power the circuit 50 and which is selectively supplied by the circuit 50 to the the DC motor 21 of the secondary pump 20. As shown in FIG. 2, the control circuit 50 generally includes a first frequency to voltage converter 51 which receives input from the flow meter 30, and a second frequency to voltage converter 52 which receives input from a speed sensor 21a on motor 21. The output of the first frequency to voltage converter 51 is coupled to a mixture adjustment circuit 53 which provides a first input for a feedback amplifier 54. The output of the second frequency to voltage converter 52 provides a second input to the feedback amplifier 54. The output of the feedback amplifier 54 is coupled to a motor control 21b which regulates the voltage applied to the motor 21 to thereby vary its speed and thus the flow rate of the secondary pump 20. As shown in FIGS. 2, the flow rates of the primary and secondary pumps are indicated by meters 55, 56 which are coupled to the outputs of the first and second frequency to voltage converters 51, 52.

The operation of the circuit 50 will be readily understood by those skilled in the art as a compensated feedback loop driving an SCR controller. When power is supplied to primary pump 12 and to DC motor 21. The flow rate of the fuel oil in gallons per minute is metered by the flow meter and a signal proportional to the flow rate is received by the control circuit 50. Simultaneously, the speed of the motor 21 is sensed by sensor 21a and a signal proportional to the motor speed is received by the circuit 50. As mentioned above, the speed of the motor 21 is proportional to the flow rate of the pump 20 and thus the flow rate of the waste oil. According to the invention, the proportion of the waste oil to fuel oil mixture is set by the mixture adjustment circuit 53. By comparing the signals from the mixture adjustment circuit 53 and the sensor 21a, the relative flow rate of the waste oil relative to the fuel oil is maintained by the feedback amplifier 54 in conjunction with the motor control 21b. The power to the motor 21 is thus constantly and automatically adjusted by the control circuit 50 to maintain a speed which will produce the desired ratio of flow rates. For example, if the desired ratio of waste oil to fuel oil is 10% and the flow rate of the primary pump 12 as detected by the flow meter 30 is 15 GPM, the speed of the motor 21 will be adjusted by the control circuit 50 to deliver a flow rate of 1.5 GPM through the secondary pump 20.

In actual practice, the primary pump 12 maintains a relatively constant flow rate of 15 GPM and the flow meter 30 detects relatively small variations in the flow rate to insure precise blending of the waste oil and the fuel oil. The PROTEUS flow meter used in the preferred embodiment delivers a signal in the form of N pulses per gallon which is provided with a time base and converted into a voltage by the first frequency to voltage converter 51. For example, when the flow rate is 15 GPM, the signal produced by the first frequency to voltage converter will be approximately 1.5 volts. If the flow rate drops to 10 GPM, the signal produced by the first frequency to voltage converter will be approximately 1 volt. If the flow rate rises to 20 GPM, the signal produced by the first frequency to voltage converter will be approximately 2 volts. Similarly, the OBERDORFER secondary pump used in the preferred embodiment produces a flow rate of 1 GPM for every approximately 417.5 RPM. The output of the speed sensor 21a is in the form of N pulses per revolution which is provided with a time base and converted into a voltage by the second frequency to voltage converter 52. For example, when the flow rate of the secondary pump 20 is 0.5 GPM, the voltage produced by the frequency to voltage converter 52 will be approximately 0.5 volts. At 1.5 GPM the voltage will be approximately 1.5 volts, etc. Those skilled in the art will appreciate, therefore that if a 10% mixture of waste oil to fuel oil is desired, the mixture adjustment circuit 53 will supply the feedback amplifier 54 with the exact voltage produced by the frequency to voltage converter 51 and the feedback amplifier will adjust the motor control 21b so that the voltages from the two frequency to voltage converters remain equal. For a 5% mixture, the mixture adjustment circuit 53 will supply the feedback amplifier with a voltage which is one half of the voltage produced by the frequency to voltage converter 51.

It will be appreciated that in addition to the specific characteristics of the primary and secondary pumps as well as the flow meter and the motor speed sensor, the relationship between the flow rates and signals received by the control circuit will be influenced by the back pressure in the fluid couplings through which the oil is pumped. Using the components specified above, the present invention contemplates an operational back pressure of between 15 to 18 PSI. However, those skilled in the art will appreciate that the control circuit can be calibrated for any expected back pressure. For purposes of the invention, a single calibration to a specific back pressure will insure sufficiently accurate results over a range of 4 PSI using the components specified above.

Turning now to FIG. 3, the presently preferred embodiment of the apparatus 10 is mounted on a portable platform 60 having wheels 62. An electrical cabinet 64 having a control panel 66 is centrally located on the platform 60 and contains the control circuit 50 as well as other components of the apparatus such as the primary and secondary pumps. The filters 22, 36, and 40 are preferably mounted as shown for easy access when changing filter elements as described above. Valves 16 and 26 for fuel oil and waste oil input are located on one side of the platform 60 and the output valve 44 is located on the other side of the platform 60. The control panel 66 preferably includes pressure gauges 22a, 36a, and 40a, as well as fuel mixture adjustment dial 53, GPM meter 55, and a master power switch 57. The platform and the apparatus contained thereon may be transported by truck to a location where it will be used and wheeled into proximity with oil containers.

There have been described and illustrated herein the presently preferred embodiments of a method and apparatus for recycling waste lubrication oil for reuse as fuel oil. While particular embodiments of the invention have been described, it is not intended that the invention be limited thereto, as it is intended that the invention be as broad in scope as the art will allow and that the specification be read likewise. Thus, while particular valves, filters, pumps and fluid couplings have been disclosed, it will be appreciated that other similar components could be utilized. Also, while a particular control circuit has been shown, it will be recognized that other types of circuits could be used with similar results obtained. Moreover, while particular configurations have been disclosed in reference to the platform and the mounting of the apparatus on the platform, it will be appreciated that other configurations could be used as well. Furthermore, while the method has been disclosed as a continuously running process, it will be understood that performing the method of the invention in several temporally discrete steps can achieve the same or similar results as disclosed herein. It will therefore be appreciated by those skilled in the art that yet other modifications could be made to the provided invention without deviating from its spirit and scope as so claimed.

We claim:

1. A method for recycling waste lubrication oil for use as fuel oil, comprising:

a) pumping new fuel oil from a source of new fuel oil at a predetermined first flow rate into a mixer;

b) monitoring said first flow rate;

c) pumping waste lubrication oil from a source of waste lubrication oil through a first filter at a second flow rate into said mixer for blending with said new fuel oil under pressure;

d) selecting said second flow rate to be a selected fraction of said first flow rate via fraction selection means, and electronically adjusting said second flow rate in response to changes in said first inflow rate to maintain said selected fraction of said first flow rate to obtain precise blending of the waste lubrication and fuel oils;

e) removing blended new fuel oil and waste lubrication oil from said mixer;

f) dehydrating said blended new fuel oil and waste lubrication oil, wherein said monitoring and said adjusting are performed substantially continuously and automatically; and g) delivering the blended oils to a place of use other than said source of new fuel oil.

2. A method according to claim 1, wherein:

said monitoring is performed by a flow meter which produces an electrical output proportional to said first flow rate;

said pumping waste lubrication oil is performed by an electric pump having a speed and said second flow rate is proportional to said speed; and said adjusting is performed by an electrical circuit which compares said electrical output of said flow meter with said speed of said electric pump.

3. A method according to claim 1, further comprising:

pumping said waste lubrication oil through a second filter prior to pumping said waste lubrication oil into said mixer.

4. A method according to claim 1, wherein:

said dehydrating said blended new fuel oil and waste lubrication oil includes filtering said blended new fuel oil and waste lubrication oil.

5. A method according to claim 1, wherein: said first flow rate is approximately fifteen gallons per minute.

6. A method according to claim 1, wherein:

said selected fraction is less than or equal to one tenth.

7. A method according to claim 1, further comprising:

selecting said selected fraction prior to said pumping new fuel oil.

8. Stand alone mobile recycling apparatus for supplying a mixture of waste lubrication oil and fuel oil for use as a fuel, comprising:

a) a first pump for pumping new fuel oil from a source of new fuel oil at a predetermined first flow rate;

b) a second pump for pumping waste lubrication oil from a source of waste lubrication oil at a second flow rate;

c) a first filter fluidly coupled to said second pump for filtering the waste lubrication oil;

d) a flow meter fluidly coupled to said first pump for measuring said first flow rate;

e) static mixer means for blending fuel and waste oils under pressure having an input and an output, said input being fluidly coupled to said first pump and said second pump for receiving and mixing said new fuel oil and said waste lubrication oil;

f) water removal means coupled to said output of said mixer for removing water from mixed new fuel oil and waste lubrication oil;

g) electronic control circuit means electrically coupled to said flow meter and said second pump for controlling said second pump to adjust said second flow rate to be maintained at a selected fraction of said first flow rate as said first flow rate varies and to insure precise blending of the waste and fuel oils;

h) fraction selection means for selecting said selected fraction, said fraction selection means being coupled to said electronic control circuit means; and i) means for delivering the blended oils to a place of use other than said source of new fuel oil.

9. An apparatus according to claim 8, further comprising:

j) a second filter fluidly coupled to said second pump for filtering the waste lubrication oil, said second filter being located between said second pump and said mixer and said first filter being located between said second pump and the source of waste lubrication oil.

10. An apparatus according to claim 9, wherein:

said first filter removes particulate matter which is seven microns or larger and said second filter removes particulate matter which is five microns or larger.

11. An apparatus according to claim 10, wherein:

said first and second filters are ram packed depth media filters.

12. An apparatus according to claim 8, wherein:

said water removal means includes filtering means for filtering said mixed new fuel oil and waste lubrication oil.

13. An apparatus according to claim 12, wherein:

said filtering means removes particulate matter which is ten microns or larger.

14. Stand alone mobile recycling apparatus for supplying a mixture of waste lubrication oil and fuel oil for use as a fuel, comprising:

a) a first pump for pumping new fuel oil from a source of new fuel oil at a predetermined first flow rate;

b) a second pump for pumping waste lubrication oil from a source of waste lubrication oil at a second flow rate;

c) a first filter fluidly coupled to said second pump for filtering the waste lubrication oil;

d) a flow meter fluidly coupled to said first pump for measuring said first flow rate and for producing an electrical output proportional to said first flow rate;

e) static mixer means for blending fuel and waste oils under pressure having an input and an output, said input being fluidly coupled to said first pump and said second pump for receiving and mixing said new fuel oil and said waste lubrication oil;

f) water removal means coupled to said output of said mixer for removing water from mixed new fuel oil and waste lubrication oil;

g) electronic control circuit means electrically coupled to said flow meter and said second pump for controlling said second pump to adjust said second flow rate to be maintained at a selected fraction of said first flow rate as said first flow rate varies and to insure precise blending of the waste and fuel oils;

h) a DC motor for driving said second pump having a speed which is proportional to said second flow rate, said DC motor being provided with an electronic speed sensor which produces an output proportional to said second flow rate and which is coupled to said electronic control circuit means;

i) said electronic control circuit means including comparator means for comparing the electrical outputs of said flow meter and said speed sensor;

j) fraction selection means for selecting said selected fraction, said fraction selection means being coupled to said comparator means for comparing the electrical outputs of said flow meter and said speed sensor; and k) means for delivering the blended oils to a place of use other than said source of new fuel oil.

15. A method for recycling waste lubrication oil for use as fuel oil, comprising:

a) pumping new fuel oil from a source of new fuel oil at a predetermined first flow rate into a mixer;

b) monitoring said first flow rate via a flow meter, said flow meter providing an output proportional to said first flow rate;

c) pumping waste lubrication oil via a DC motor from a source of waste lubrication oil through a first filter at a second flow rate into said mixer for blending with said new fuel oil under pressure, said DC motor having a speed sensor, said speed sensor providing an output proportional to said second flow rate;

d) comparing the electrical output of said flow meter and said speed sensor;

e) selecting said second flow rate to be a selected fraction of said first flow rate and electronically adjusting said second flow rate in response to changes in said first flow rate to maintain said selected fraction of said first flow rate to obtain precise blending of the waste lubrication and fuel oils;

f) removing blended new fuel oil and waste lubrication oil from said mixer;

g) dehydrating said blended new fuel oil and waste lubrication oil, wherein said monitoring and said adjusting are performed substantially continuously and automatically; and h) delivering the blended oils to a place of use other than said source of new fuel oil.

* * * * *